UNITED STATES PATENT OFFICE.

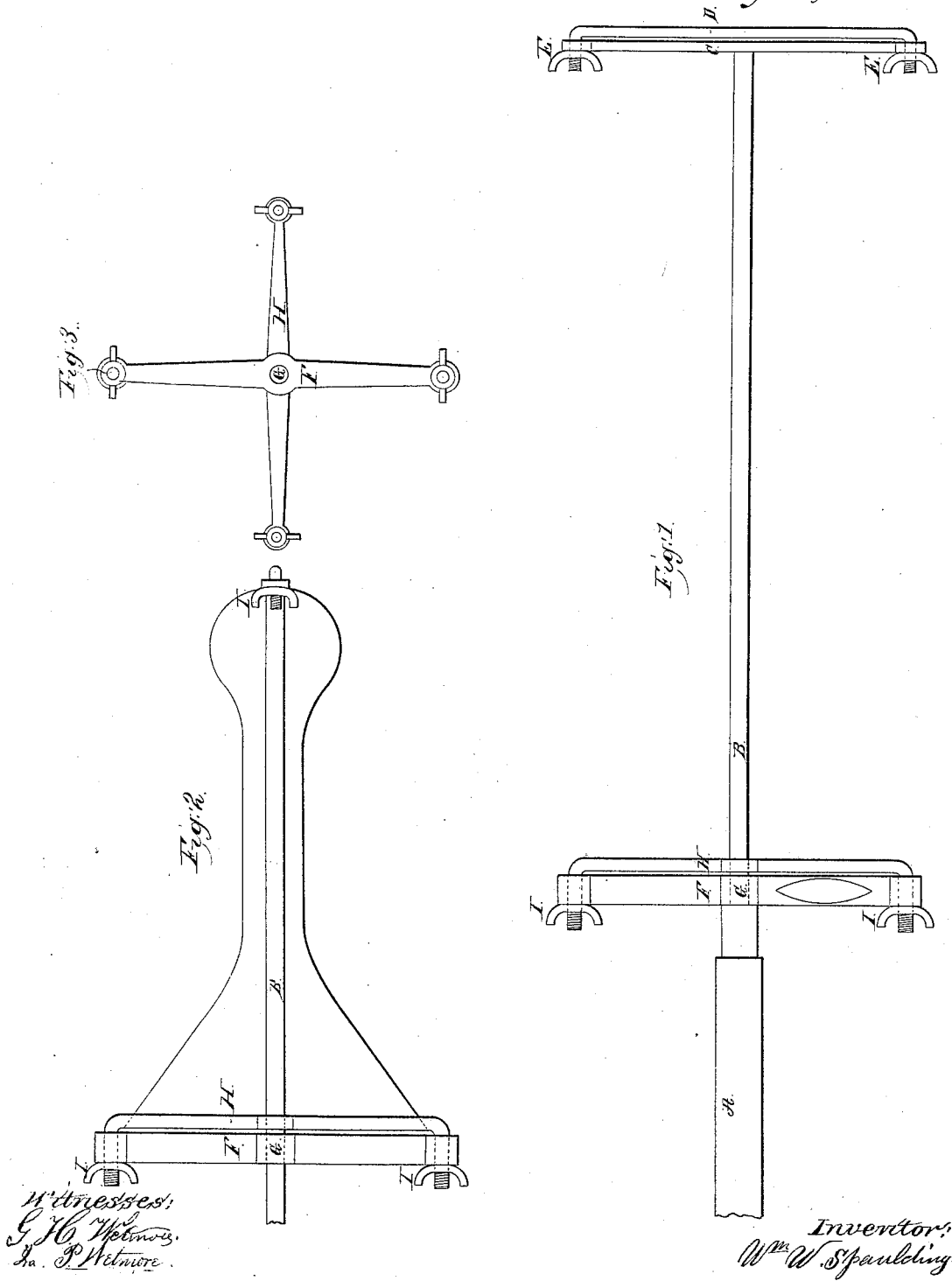

WILLIAM W. SPAULDING, OF GALESBURG, ILLINOIS.

IMPROVED MOP-HEAD.

Specification forming part of Letters Patent No. 49,566, dated August 22, 1865.

*To all whom it may concern:*

Be it known that I, WILLIAM W. SPAULDING, of the city of Galesburg, county of Knox, and State of Illinois, have invented a new and Improved Mop; and I do hereby declare that the following is a full and exact description thereof, reference being had to the accompanying drawings, and to the letters of reference marked thereon.

Figure 1 represents a perspective view. Fig. 2 represents a side view. Fig. 3 represents the head.

A is the wooden handle. B is the iron rod. C is the permanent head, fastened to rod B. D is the cross-rod or fastener, with screws cut at each end. E E are the burrs or nuts. F is the sliding head. G is the hole in center of head. H is the cross-rod, with a screw cut at each end. I I are the burrs or nuts.

The nature of my invention consists in preparing a wooden handle, also a rod of iron. I then prepare a cross-head, which is fastened permanently to rod B. Through each end are holes. I then prepare a cross-rod, D, on each end. I cut a screw and head on each end, so as to pass the ends through the head C, which is fastened to rod B. To these screws I apply burrs or nuts E E, which I use for the purpose of holding or fastening the cloth. F is the sliding head, which is not permanently fastened to the rod. It is constructed by a cross-head with a hole through the center, as shown by letter G, over which passes a rod similar to that shown in the permanent head, with its cross-rod H with screws cut on each end, and nuts or burrs attached, as shown by letters I I.

To enable others to use my invention, I will proceed to describe its operation.

I take the cloth, which I pass between the rods C and D, and which is fastened by turning the burrs or nuts E E. The cloth is fastened to the sliding head F by passing each end between the cross-rods H and F, then by turning the nuts or burrs I I attached to the ends of cross-rod H. I then take hold of the handle A with one hand and head C with the other. I slide the head on rod B down to head C. This throws the cloth double. It is then ready for use. Then to wring the cloth I take hold of sliding head F and draw it up toward the wooden handle, and by twisting it around the rod the cloth is wrung sufficiently dry.

What I claim as my invention, and desire to secure by Letters Patent, is—

The combination of the rod B with head C and sliding head F and the handle A, when the parts are arranged in the manner as set forth.

WM. W. SPAULDING.

Witnesses:
   JAS. McC. LEE,
   ISAAC DELANO.